United States Patent
Wang et al.

(10) Patent No.: US 8,687,540 B2
(45) Date of Patent: Apr. 1, 2014

(54) ECHO CANCELLATION REPEATER USING AN INSERTED PILOT WITH GAIN-BASED POWER LEVEL CONTROL SCHEME

(75) Inventors: Michael Mao Wang, San Diego, CA (US); Gwendolyn Denise Barriac, Encinitas, CA (US); Dhananjay Ashok Gore, San Diego, CA (US); Tao Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 13/155,275

(22) Filed: Jun. 7, 2011

(65) Prior Publication Data

US 2012/0314646 A1  Dec. 13, 2012

(51) Int. Cl.
*H04B 7/14* (2006.01)
*H04B 3/36* (2006.01)
*H04B 7/17* (2006.01)
*H04B 17/02* (2006.01)

(52) U.S. Cl.
USPC .......................................... 370/315; 375/211

(58) Field of Classification Search
USPC .......................................... 370/315; 375/211
See application file for complete search history.

(56) References Cited

U.S. PATENT DOCUMENTS

| | | | |
|---|---|---|---|
| 6,385,435 B1 | 5/2002 | Lee | |
| 2003/0157943 A1 | 8/2003 | Sabat, Jr. | |
| 2008/0182511 A1 | 7/2008 | Adkins et al. | |
| 2009/0196215 A1 | 8/2009 | Sabat et al. | |
| 2009/0291632 A1 | 11/2009 | Braithwaite et al. | |
| 2010/0284445 A1* | 11/2010 | Barriac et al. | 375/211 |

FOREIGN PATENT DOCUMENTS

| WO | 2004095763 | 11/2004 |
|---|---|---|
| WO | 2008048534 A1 | 4/2008 |

OTHER PUBLICATIONS

International Search Report and Written Opinion—PCT/US2011/043430—ISA/EPO—Feb. 21, 2012.

* cited by examiner

*Primary Examiner* — Ronald Abelson

(74) *Attorney, Agent, or Firm* — Thien T. Nguyen

(57) ABSTRACT

A device for generating a pilot signal for use in a wireless repeater where the pilot signal is added to a transmit signal for transmission includes a pilot power control unit configured to set a power level of the pilot signal as a function of a gain of the repeater and a power level of the transmit signal, where the function comprises a linear or non-linear function. In one embodiment, the operation of the repeater may be divided into gain regions and the inserted pilot power is controlled according to the different gain regions of the repeater. When the repeater gain is low, the pilot power may be set greater than the transmit power to ensure there is sufficient signal to use for channel estimation. When the repeater gain is in steady state, the pilot power may be set to be lower than the transmit power to avoid interference.

20 Claims, 3 Drawing Sheets

ECHO CANCELLATION REPEATER USING AN INSERTED PILOT WITH GAIN-BASED POWER LEVEL CONTROL SCHEME

BACKGROUND

1. Field

This disclosure generally relates to repeaters in wireless communication systems, and in particular, to a method and apparatus for inserted pilot power control in an echo cancellation repeater.

2. Background

Wireless communication systems and techniques have become an important part of the way we communicate. However, providing coverage can be a significant challenge to wireless service providers. One way to extend coverage is to deploy repeaters.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. In one embodiment, a device for generating a pilot signal for use in a wireless repeater where the pilot signal is added to a transmit signal for transmission on a transmitting antenna of the repeater includes a pilot power control unit configured to set a power level of the pilot signal as a function of a gain of the repeater and a power level of the transmit signal, where the function comprises a linear or non-linear function.

According to another aspect of the present invention, a method for generating a pilot signal for use in a wireless repeater where the pilot signal is added to a transmit signal for transmission on a transmitting antenna of the repeater includes setting a power level of the pilot signal as a function of a gain of the repeater and a power level of the transmit signal, where the function comprises a linear or non-linear function.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (loop gain less than unity). However, increasing the repeater gain renders stable operation more difficult due to the increased signal leaking back into the donor antenna. In general, loop stability and minimal noise injection demands require that the signal leaking back into the donor antenna from the coverage antenna be much lower than the remote signal (the signal to be repeated). Thus, to ensure stability, a repeater's gain is traditionally limited to less than the isolation from the server antenna to the donor antenna, by some margin. When the gain of a traditional repeater exceeds its isolation, a positive feedback condition occurs resulting in oscillation.

Systems and techniques herein provide for wireless repeaters employing interference cancellation or echo cancellation to use an inserted pilot as the reference signal for estimating the feedback channel. The wireless repeater implements gain-based power level control to adjust the power of the inserted pilot to improve the quality of the channel estimation while maintaining repeater stability. In this manner, the wireless repeaters realized improved isolation between the repeaters' donor antenna ("the receiving antenna" for forward link communications) and the coverage antenna ("the transmitting antenna" for forward link communications). Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between repeater antennas;

that is, "interference cancellation" refers to partial or complete cancellation of the leakage signal.

Figure 1:
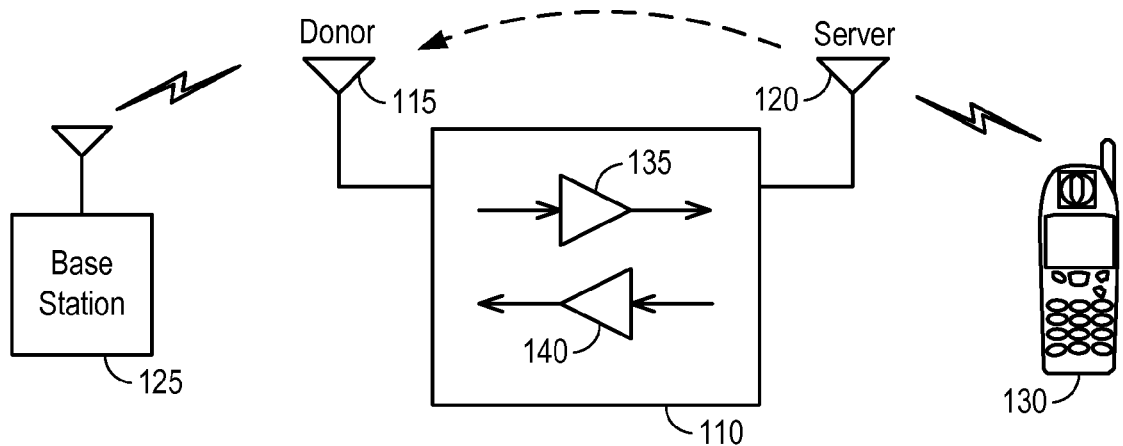
FIG. 1 is a simplified diagram of a repeater according to the prior art.
Figure 2:
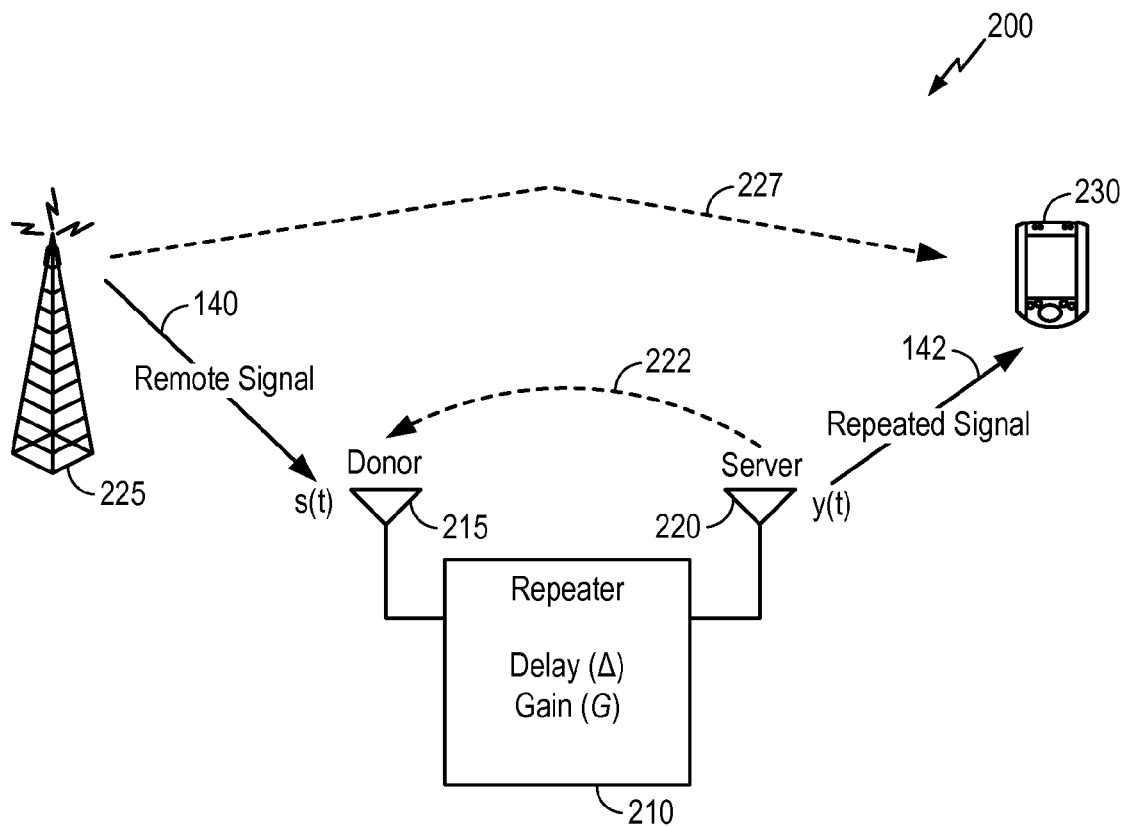
FIG. 2 shows a diagram of a repeater environment according to some embodiments of the present invention.

FIG. 2 shows a diagram of an operating environment 200 for a repeater 210 according to embodiments of the present invention. In FIG. 2, a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay Δ is configured to repeat a signal received from base station 225 on a donor antenna 215 ("the receiving antenna") and amplify and transmit the signal to mobile device 230 using a server antenna 220 ("the transmitting antenna"). Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where y(t)= $\sqrt{G}s(t-\Delta)$. Ideally, the gain G would be large, the inherent delay Δ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay Δ. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In embodiments of the present invention, a repeater suitable for indoor coverage (e.g., business, residential, or similar use) is provided. The repeater has an active gain of about 70 dB or greater which is an example of a sufficient gain for coverage in a moderately sized residence. Furthermore, the repeater has a loop gain of less than one for stability and a sufficient amount of margin for stability and low output noise floor. In the present description, loop gain refers to the gain or the ratio of the power of a signal transmitted through a feedback loop as compared to the original signal. In some embodiments, the repeater has a total isolation of greater than 80 dB. In some embodiments, the repeater employs interference/echo cancellation to achieve a high level of active isolation, which is significantly more challenging than the requirements of available repeaters.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Some techniques of the present invention utilize channel estimation to enable the required level of echo cancellation. By estimating the feedback channel (the channel between the antennas) to a sufficient degree of accuracy, the residual error, post echo cancellation, can be sufficiently below the remote signal to realize the desired loop gain margin for stability. In embodiments of the present invention, a repeater employing echo cancellation uses an inserted pilot as the reference signal for estimating the feedback channel. That is, a known pilot signal is inserted into the desired transmitted signal of an echo cancellation repeater. The repeater transmits the desired transmitted signal plus the inserted pilot. The repeater receives a feedback signal which includes the feedback pilot signal. The inserted pilot signal is used as the reference signal for channel estimation instead of using the transmitted signal as the reference signal as in the conventional repeaters. Using a known inserted pilot for channel estimation provides many advantages, including robustness to multipath delay spread from the base station, and robustness to interference from neighboring repeaters.

In an echo cancellation repeater, the feedback channel is estimated so that the feedback signal (or "leakage signal") can be estimated and subtracted out. When the repeater uses an inserted pilot for channel estimation, the received signal of the repeater is the remote signal plus the feedback signal (or the leakage signal) which includes a feedback pilot signal. For purposes of feedback channel estimation, the inserted pilot is used as the reference signal while the portion of the desired transmit signal fed back is treated as noise. The composite receive signal, including the feedback pilot signal, is fed into a channel estimation algorithm and the resulting feedback channel estimate (ĥ) is used to generate a replica of the feedback signal—that is, the portion of the transmit signal that was echoed back to the donor antenna. The estimated feedback signal is then subtracted from the received signal to cancel out the undesired feedback signal at the input to the repeater. Echo cancellation is thus realized in the repeater.

In the present description, only downlink transmission of a repeater is discussed but the present description applies to uplink transmission as well. When an inserted pilot is used, the repeater transmits the desired transmitted signal (the amplified remote signal) plus the inserted pilot in either uplink or downlink transmission.

Figure 3:
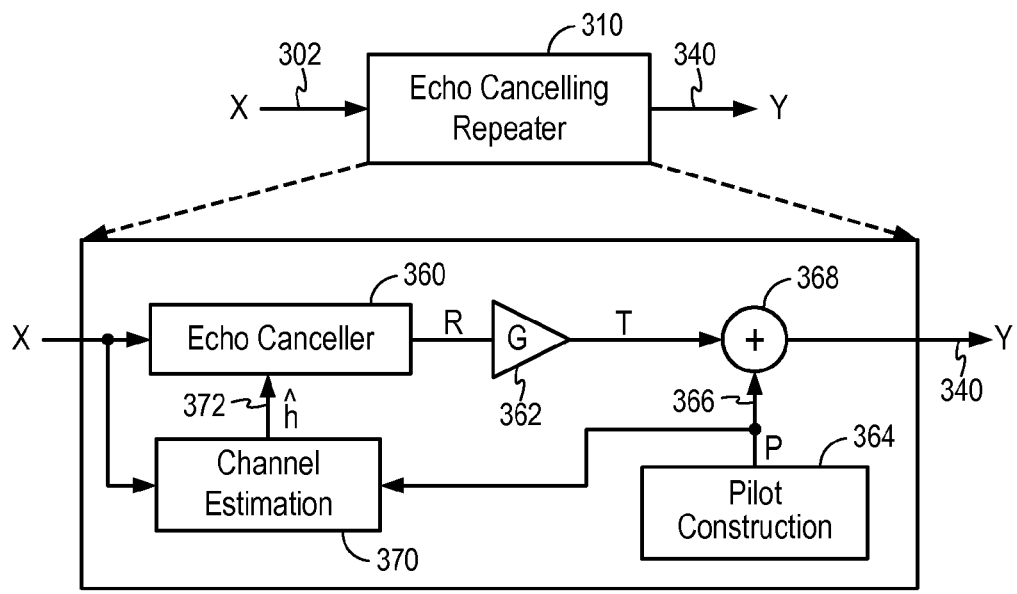
FIG. 3 is a block diagram of a repeater incorporating a pilot construction system according to one embodiment of the present invention.

FIG. 3 is a block diagram of a repeater incorporating a pilot construction system according to one embodiment of the present invention. An echo cancelling repeater 310 receives a receive signal or an input signal X (node 302) and generates an output signal or amplified signal Y (node 340) to be transmitted. In the echo cancelling repeater 310, a pilot construction block 364 is provided to introduce a pilot P to the output signal Y. More specifically, in repeater 310, an echo canceller 360 receives the input signal X and generates an echo-cancelled signal R. The echo-cancelled signal R is coupled to a gain block 362 to be amplified. The gain block 362 generates the desired transmit signal T which is derived from the received signal X. The pilot P (node 366), generated by pilot construction block 364, is added to the desired transmit signal T (summer 368) to generate the output signal Y. The output signal Y is thus a composite transmit signal where Y=T+P. The transmit signal may be a single carrier signal or a multi-carrier signal. The pilot P is also coupled to a channel estimation block 370 which uses the pilot P and the receive signal X to generate a channel estimate $\hat{h}$. The channel estimate $\hat{h}$ is provided to the echo canceller 360 for performing echo cancellation.

In operation, the pilot P is perceived as noise by devices receiving the composite transmitted signal from the repeater. To ensure that this perceived noise is low enough, the inserted pilot P should have a power level in steady state that is sufficiently lower than the power level of the desired transmitted signal T. However, in some operation conditions, it may be desirable for the pilot P to have a larger power level. For instance, when the repeater is starting up, referred to as the "boot-up" state, the repeater gain is low. In that case, the inserted pilot should have a power level greater than the power level of the desired transmitted signal to ensure stability.

According to some embodiments of the present invention, the pilot construction unit 364 implements an inserted pilot power level control method operative to control the power ratio of the inserted pilot signal to the desired transmit signal as a function of the gain of the repeater. More specifically, in some embodiments, the operation of the repeater is divided into at least two gain regions and the power level of the inserted pilot signal is controlled according to the different gain regions of the repeater. When the repeater gain is low, the pilot power is set greater than the transmit power to ensure there is sufficient signal to use as the reference signal for channel estimation. When the repeater gain is higher or in steady state, the pilot power is set to be lower than the transmit power to avoid interference with intended transmission. In one embodiment, the repeater operation is divided into a low gain or boot-up region, a transition region, and a steady state region. Furthermore, the power level of the inserted pilot signal is controlled as a ratio of the pilot power to transmit power so that the pilot power tracks the transmit power in low gain and steady state operations. The pilot construction unit 364 may include a pilot power control unit for setting the power of the pilot signal in the different gain regions of the repeater. The pilot power control unit may be implemented using hardware, software, firmware or any combination thereof.

Figure 4:
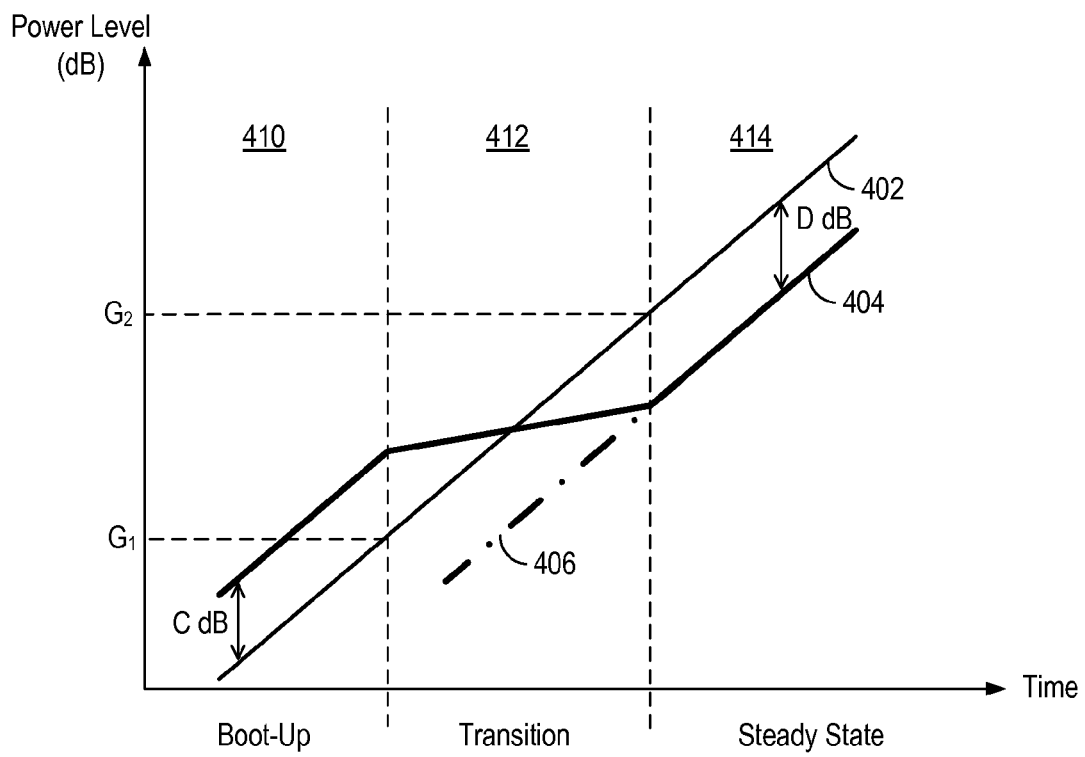
FIG. 4 illustrates the operation of the inserted pilot power level control method in an echo cancellation repeater using three gain regions according to one embodiment of the present invention.

FIG. 4 illustrates the operation of the inserted pilot power level control method in an echo cancellation repeater using three gain regions according to one embodiment of the present invention. Referring to FIG. 4, the gain of the repeater which is representative of the power of the transmit signal is illustrated as curve 402 and the power of the inserted pilot signal is illustrated as curve 404. The operation of the repeater is divided into three gain regions: a boot-up or low gain region 410, a transition region 412 and a steady state region 414. A lower gain threshold $G_1$ defines the boundary between the boot-up region 410 and the transition region 412. An upper gain threshold $G_2$ defines the boundary between the transition region 412 and the steady state region 414. In one embodiment, the lower gain threshold $G_1$ is set to be 10 dB less than the feedback channel isolation and the upper gain threshold $G_2$ is set to be 10 dB greater than feedback channel isolation. That is:

$G_1$=Ant_Iso−10(dB), and $G_2$=Ant_Iso+10(dB), wherein Ant_Iso denotes the feedback channel isolation and is determined through feedback channel gain estimation.

The inserted pilot power level control method realizes gain-based power level control. In the present embodiment, the power level of the inserted pilot for the three regions are defined as:

$$P_{IP} - P_{TX} = \begin{cases} C \text{ (dB)}, & \text{if } G < G_1; \\ C - \dfrac{G - G_1}{G_2 - G_1}(D + C) \text{ (dB)}, & \text{if } G_1 \leq G < G_2; \\ -D \text{ (dB)}, & \text{if } G \geq G_2, \end{cases}$$

where $P_{IP}$ is the power of the inserted pilot and $P_{TX}$ is the power of the desired transmit signal.

During the initial start-up of the repeater, the gain of the repeater is low and the repeater operates in the boot-up or low gain region 410. In some cases, the repeater gain may also be adjusted to a low level when there is excessive noise in the environment. In the low gain region 410 of the repeater, the power level of the inserted pilot signal $P_{IP}$ is set to a first pilot-to-transmit power ratio where the power level of the pilot signal is set to be greater than the power level of the desired transmit signal by a given amount, such as C dB. For example, the pilot power may be 10 to 15 dB higher than the transmit power. Furthermore, the pilot power tracks the transmit power at all time. Thus, in the boot-up region, regardless of the changes in the transmit signal power level, the pilot power will always be larger than the transmit signal power.

When the gain of the repeater increases pass the lower gain threshold $G_1$, the repeater enters the transition region 412. In the transition region, the power level of the inserted pilot signal transitions from the first pilot-to-transmit power ratio to a second pilot-to-transmit power ratio according to a control curve. The second pilot-to-transmit power ratio is used in the steady state operation of the repeater and sets the power of the pilot signal to be lower than the power level of the desired transmit signal by a given amount, such as D dB. For example, the pilot power may be −10 dB to −15 dB lower than the transmit power. The control curve transitions the power setting of the pilot signal gradually between the first and second pilot-to-transmit power ratio settings (e.g., from +15 dB to −15 dB) to ensure a smooth transition of the pilot power levels, thereby ensuring repeater stability. In the present embodiment, a linear transition is used in the transition region. In other embodiments, other control curve can be used to transitions the pilot power from the boot-up state to the steady state of repeater operation.

When the gain of the repeater exceeds the upper gain threshold $G_2$, the repeater enters the steady state region 414.

In the steady state region 414, the power level of the inserted pilot signal is controlled according to the second pilot-to-transmit power ratio where the inserted pilot signal has a power level lower than the desired transmit signal by a given amount, such as D dB. For example, the pilot power may be −10 to −15 dB lower than the transmit power. Furthermore, the pilot power tracks the transmit power at all time. In this manner, in steady state operation, regardless of the changes in the transmit signal power level, the pilot power will always be lower than the transmit signal power.

Figure 5:
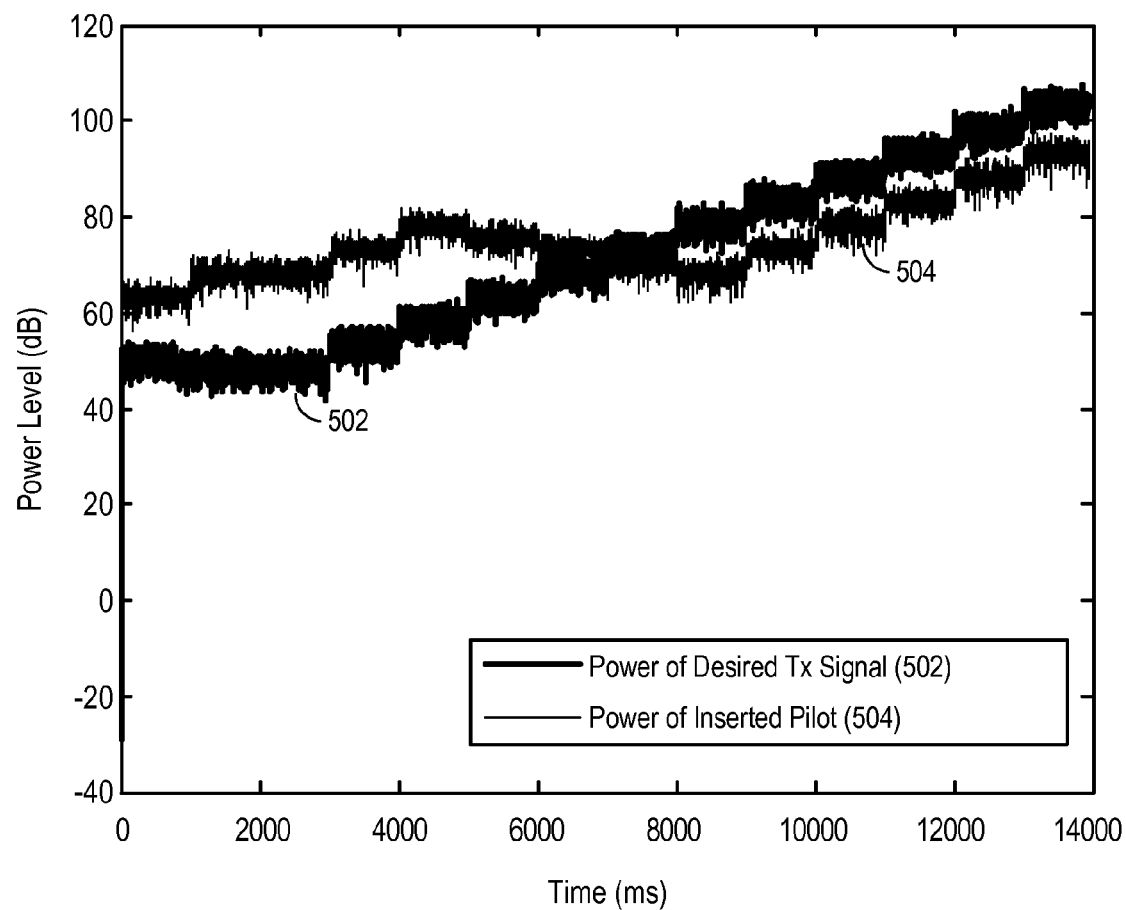
FIG. 5 is a plot illustrating one exemplary embodiment of the inserted pilot power level control method where the inserted pilot power is controlled relative to the transmit signal power over three gain regions of the repeater operation.

FIG. 5 is a plot illustrating one exemplary embodiment of the inserted pilot power level control method where the inserted pilot power is controlled relative to the transmit signal power over three gain regions of the repeater operation.

Returning to FIG. 4, in one embodiment, once the repeater boots up successfully, that is, the repeater gain ramps up above the upper gain threshold $G_2$, the inserted pilot power is locked to be D dB below the transmit signal power. However, in repeater operation, even after the repeater gain has reached steady state, the repeater gain may drop below the upper gain threshold $G_2$ again due to deterioration of the feedback channel, such as when objects are moved close to the repeater causing high fading frequency. In the present embodiment, even if the repeater gain drops below the upper gain threshold $G_2$ after reaching the steady state region, the inserted pilot power remains D dB lower than the transmit signal power, as shown by the dot-dash line 406 in FIG. 4.

In another embodiment, the inserted pilot power level control method maintains the region-based pilot power control even after the repeater gain has reached steady state. That is, if the feedback channel worsens temporarily and the repeater gain drops below the upper gain threshold $G_2$ after reaching steady state, the inserted pilot power is allowed to move back to the transition region 412 where the pilot power is determined by the control curve, as stated above. And when the repeater gain drops even further into the low gain region 410, the inserted pilot power may be controlled to be C dB higher than the transmit power. The region-based pilot power control helps to sustain the channel estimation quality during temporary hostile operating condition, and the repeater gain may recover quickly after the feedback channel improves.

During the boot-up or low gain region, the repeater gain may be very low. In that case, the inserted pilot power may be set at very low levels during boot-up, such as lower than the thermal noise. When the power of the pilot signal is too low, the quality of the channel estimation cannot be maintained. According to embodiments of the present invention, a minimum power level for the inserted pilot is applied. In some embodiments, the minimum power level for the inserted pilot is at thermal noise level.

In one embodiment, the power levels of the inserted pilot for three gain regions of the repeater are then given as:

$$P_{IP} = \min\left\{ Therm, P_{TX} + \begin{cases} C \text{ (dB)}, & \text{if } G < G_1; \\ C - \dfrac{G - G_1}{G_2 - G_1}(D + C) \text{ (dB)}, & \text{if } G_1 \leq G < G_2; \\ -D \text{ (dB)}, & \text{if } G \geq G_2, \end{cases} \right\}$$

where $P_{IP}$ is the power of the inserted pilot, $P_{TX}$ is the power of the desired transmit signal, and the term "Therm" denotes thermal noise level. In this manner, the inserted power is ensured to have a minimum power level sufficient for performing meaningful channel estimation.

In the above-described embodiments, the inserted pilot power level control method operates to control the inserted pilot power relative to the transmit signal power over two or more gain regions of the repeater operation. The inserted pilot power in each gain region is set as a predetermined function of the transmit signal power and the repeater gain where the predetermined function can be a linear function or a non-linear function. In embodiments of the present invention the inserted pilot power level control method can also operate to control the inserted pilot power relative to the transmit signal power over a single gain region of the repeater operation. The inserted pilot power in the single gain region can be any function, such as linear, non-linear, piecewise-linear functions, of the gain and the transmit signal power.

According to embodiments of the present invention, the inserted pilot signal can have various signal structure, spectral characteristics and data structure suitable or helpful for channel estimation. In some embodiments, the pilot is constructed so that it has the same spectral characteristics as the amplified signal. The pilot signal can be a multi-carrier signal or a single carrier signal, depending on the nature of the transmit signal. In one embodiment, the pilot signal used in the present description is constructed using the inserted pilot construction method described in copending and commonly assigned U.S. patent application Ser. No. 12/609,579, entitled "Inserted Pilot Construction For An Echo Cancellation Repeater," filed on Oct. 30, 2009, which application is incorporated herein by reference in its entirety. In another embodiment, the repeater in the present description implements the two-stage echo cancellation scheme described in copending and commonly assigned U.S. patent application Ser. No. 12/609,698, entitled "Dual-Stage Echo Cancellation In A Wireless Repeater Using An Inserted Pilot," filed on Oct. 30, 2009, which application is incorporated herein by reference in its entirety.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more of the above-described embodiments, the functions and processes described may be implemented in hardware, software, firmware, or any combination thereof. If implemented in software, the functions may be stored as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. "Machine readable medium" does not refer to transitory propagating signals.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A device for generating a pilot signal for use in a wireless repeater, the pilot signal being added to a transmit signal for transmission on a transmitting antenna of the repeater, the device comprising:

a pilot power control unit configured to set a power level of the pilot signal as a function of a gain of the repeater and a power level of the transmit signal, according to a first pilot-to-transmit power ratio when the gain of the repeater is less than a first gain threshold, to transition the power level of the pilot signal from the first pilot-to-transmit power ratio to a second pilot-to-transmit power ratio according to a control curve when the gain of the repeater is greater than the first gain threshold but less than a second gain threshold, the second gain threshold being higher than the first gain threshold, and to set the power level of the pilot signal according to the second pilot-to-transmit power ratio when the gain of the repeater is greater than the second gain threshold.

2. The device of claim 1, wherein the first pilot-to-transmit power ratio sets the power level of the pilot signal to be C dB higher than the power level of the transmit signal.

3. The device of claim 1, wherein the pilot power control unit is configured to transition the power level of the pilot signal from the first pilot-to-transmit power ratio to a second pilot-to-transmit power ratio using a linear transition.

4. The device of claim 1, wherein the second pilot-to-transmit power ratio sets the power level of the pilot signal to be D dB lower than the power level of the transmit signal.

5. The device of claim 1, wherein once the gain of the repeater exceeds the second gain threshold, the pilot power control unit is configured to set the power level of the pilot signal to the second pilot-to-transmit power ratio even if the gain of the repeater subsequently drops below the second gain threshold.

6. The device of claim 1, wherein when the gain of the repeater exceeds the second gain threshold and then subsequently drops below the second gain threshold, the pilot power control unit is configured to set the power level of the pilot signal according to the gain of the repeater, wherein the power level of the pilot signal is determined by the control curve when the gain of the repeater is between the first gain threshold and the second gain threshold, and the power level of the pilot signal is set to the first pilot-to-transmit power ratio when the gain of the repeater is less than the first gain threshold.

7. The device of claim 1, wherein the pilot power control unit is configured to set a minimum power level for the pilot signal, regardless of the first or second pilot-to-transmit power ratio.

8. The device of claim 7, wherein the minimum power level for the pilot signal is the thermal noise level.

9. The device of claim 1, wherein the first gain threshold is a given gain level below an antenna isolation of the repeater and the second gain threshold is a given gain level above the antenna isolation of the repeater.

10. A method for generating a pilot signal for use in a wireless repeater, the pilot signal being added to a transmit signal for transmission on a transmitting antenna of the repeater, the method comprising:

setting the power level of the pilot signal according to a first pilot-to-transmit power ratio when the gain of the repeater is less than a first gain threshold;

transitioning the power level of the pilot signal from the first pilot-to-transmit power ratio to a second pilot-to-transmit power ratio according to a control curve when the gain of the repeater is greater than the first gain threshold but less than a second gain threshold, the second gain threshold being higher than the first gain threshold; and setting the power level of the pilot signal according to the second pilot-to-transmit power ratio when the gain of the repeater is greater than the second gain threshold.

11. The method of claim 10, wherein setting the power level of the pilot signal to the first pilot-to-transmit power ratio when the gain of the repeater is less than a first gain threshold comprises:

setting the power level of the pilot signal to be C dB higher than the power level of the transmit signal.

12. The method of claim 11, wherein transitioning the power level of the pilot signal from the first pilot-to-transmit power ratio to a second pilot-to-transmit power ratio comprises:

transitioning the power level of the pilot signal from the first pilot-to-transmit power ratio to the second pilot-to-transmit power ratio using a linear transition.

13. The method of claim 11, wherein setting the power level of the pilot signal to the second pilot-to-transmit power ratio when the gain of the repeater is greater than the second gain threshold comprises:

setting the power level of the pilot signal to be D dB lower than the power level of the transmit signal.

14. The method of claim 11, further comprising:

setting the power level of the pilot signal to the second pilot-to-transmit power ratio once the gain of the repeater is greater than the second gain threshold, even if the gain of the repeater subsequently drops below the second gain threshold.

15. The method of claim 11, further comprising:

when the gain of the repeater exceeds the second gain threshold and then subsequently drops below the second gain threshold, setting the power level of the pilot signal according to the gain of the repeater, wherein the power level of the pilot signal is determined by the control curve when the gain of the repeater is between the first gain threshold and the second gain threshold, and the power level of the pilot signal is set to the first pilot-to-transmit power ratio when the gain of the repeater is less than the first gain threshold.

16. The method of claim 11, further comprising:

setting the power level of the pilot signal to a minimum power level, regardless of the first or second pilot-to-transmit power ratio.

17. The method of claim 16, wherein setting the power level of the pilot signal to a minimum power level comprises setting the power level of the pilot signal to the thermal noise level.

18. The method of claim 11, wherein the first gain threshold is a given gain level below an antenna isolation of the repeater and the second gain threshold is a given gain level above the antenna isolation of the repeater.

19. A device for generating a pilot signal for use in a wireless repeater, the pilot signal being added to a transmit signal for transmission on a transmitting antenna of the repeater, the device comprising:

means for setting a power level of the pilot signal as a function of a gain of the repeater and a power level of the transmit signal, according to a first pilot-to-transmit power ratio when the gain of the repeater is less than a first gain threshold, means for transitioning the power level of the pilot signal from the first pilot-to-transmit power ratio to a second pilot-to-transmit power ratio according to a control curve when the gain of the repeater is greater than the first gain threshold but less than a second gain threshold, the second gain threshold being higher than the first gain threshold, and means for setting the power level of the pilot signal according to the second pilot to transmit power ratio when the gain of the repeater is greater than the second gain threshold.

20. A computer readable medium having stored thereon computer executable instructions for performing at least the following acts:

generating a pilot signal for use in a wireless repeater, the pilot signal being added to a transmit signal for transmission on a transmitting antenna of the repeater; and setting a power level of the pilot signal as a function of a gain of the repeater and a power level of the transmit signal, according to a first pilot-to-transmit power ratio when the gain of the repeater is less than a first gain threshold;

transitioning the power level of the pilot signal from the first pilot-to-transmit power ratio to a second pilot-to-transmit power ratio according to a control curve when the gain of the repeater is greater than the first gain threshold but less than a second gain threshold, the second gain threshold being higher than the first gain threshold; and setting the power level of the pilot signal according to the second pilot-to-transmit power ratio when the gain of the repeater is greater than the second gain threshold.

* * * * *